United States Patent [15] 3,646,362

Limberg [45] Feb. 29, 1972

[54] SAMPLE-AND-HOLD CIRCUIT

[72] Inventor: Allen LeRoy Limberg, Somerville, N.J.

[73] Assignee: RCA Corporation

[22] Filed: Apr. 30, 1970

[21] Appl. No.: 33,336

[52] U.S. Cl. ..............................307/238, 307/232, 307/246, 328/151

[51] Int. Cl. ..............................H03k 17/00

[58] Field of Search ..................307/246, 238, 232; 328/151, 328/65, 133

[56] References Cited

UNITED STATES PATENTS 3,157,797 11/1964 Eshelman ..............................307/246

3,336,518 8/1967 Murphy .............................328/151 X

*Primary Examiner*—Donald D. Forrer

*Assistant Examiner*—B. P. Davis

*Attorney*—Eugene M. Whitacre

[57] ABSTRACT

A sample-and-hold circuit employs first and second transistors of the same conductivity type, having serially coupled collector-to-emitter current paths and including a feedback path coupling the collector of the first transistor to the base of the second transistor to provide a high-input impedance and a relatively low-output impedance circuit suitable for rapid updating of a hold capacitor. The circuit samples an applied signal when the first and second transistors are keyed into conduction by keying circuit means, and holds when these transistors are biased out of conduction. The circuit is particularly suited for application as a phase comparator.

6 Claims, 2 Drawing Figures

Figure 1:
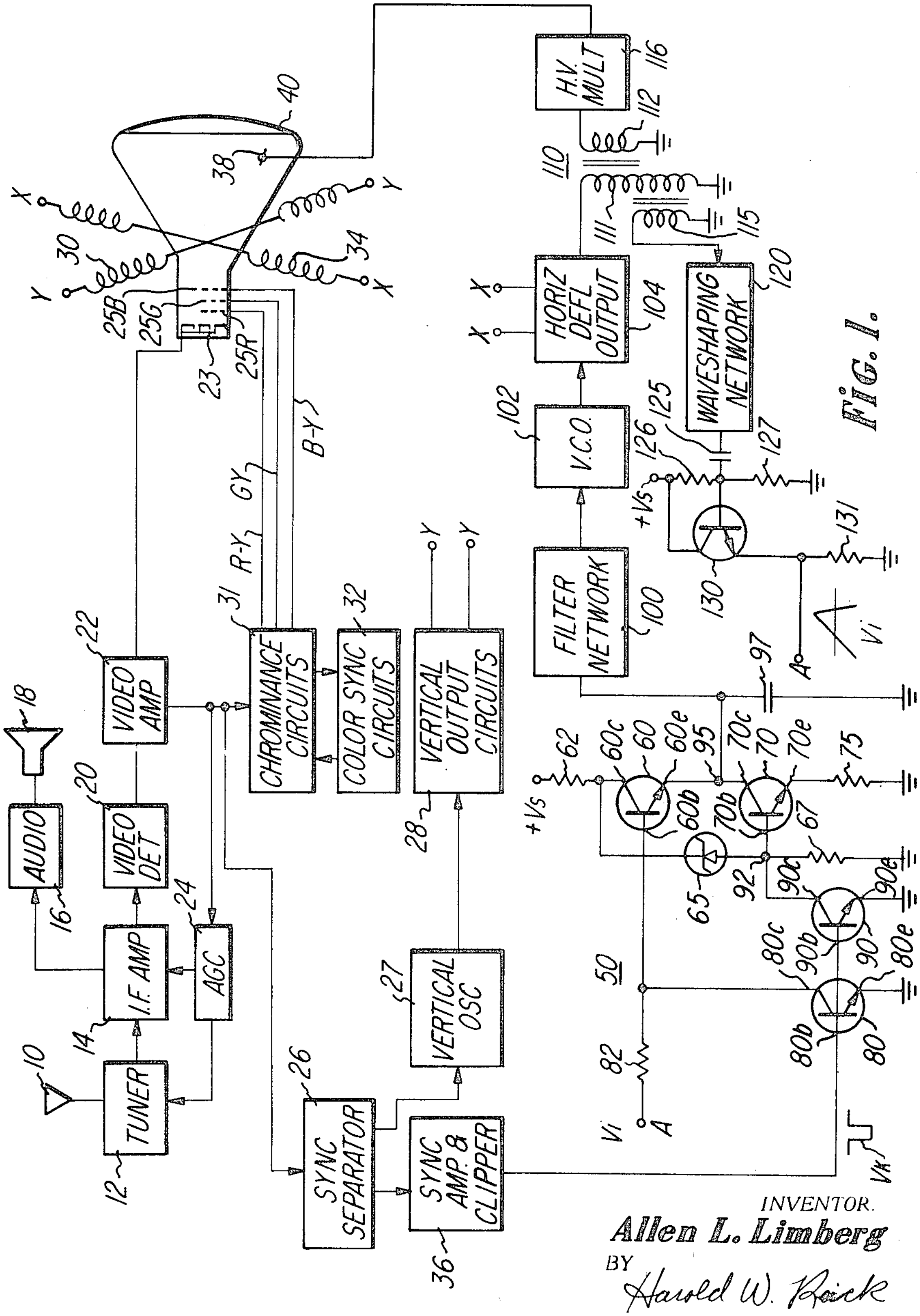

INVENTOR.
Allen L. Limberg
BY Harold W. Rieck
ATTORNEY

INVENTOR.
Allen L. Limberg
BY
Harold W. Reick
ATTORNEY

SAMPLE-AND-HOLD CIRCUIT

The present invention relates to sample-and-hold circuits and is suitable for use as a phase comparator in a television receiver.

In television receivers, phase comparators (detectors) are employed to provide an error voltage which is utilized to control the frequency of oscillators, for example, the horizontal oscillator in the horizontal deflection system. The comparator senses a signal which is related to the horizontal oscillator frequency and compares this signal with the incoming synchronization signal transmitted by the broadcaster. The output of the phase comparator reflects timing differences between the two sampled signals to provide an output error voltage which can be applied to a controllable oscillator. In many systems, the sampled signals of the horizontal oscillator frequency takes the form of a sawtooth voltage waveform which is applied to a keyed phase detector. The detector is essentially an amplifier triggered into conduction by a keying pulse coincident with the arrival of the incoming sync pulse to provide an output voltage only during the sampling interval (i.e., during the sync pulse interval). The output voltage of the keyed detector will depend upon the relative phasings of the sawtooth voltage and the keying pulse. This voltage is then filtered by a low pass filter which removes keying frequency components. The phase comparator can be designed so that when the horizontal oscillator frequency is in synchronism with the arriving sync pulses the sawtooth ramp voltage is crossing its reference voltage level at the middle of the sync interval. Thus, when in synchronism, the phase comparator input sees an equivalent amount of negative and positive (relative to the reference voltage) sawtooth ramp voltage, and the net filtered output voltage remains unchanged. When the horizontal oscillator is out of synchronism, the sampled interval will be aligned with the incoming sawtooth ramp to provide either a net positive or a net negative change in the output voltage of the phase comparator which serves as an error voltage to correct the horizontal oscillator frequency.

A sample-and-hold circuit is particularly well suited for application as a keyed phase detector, since it displays a very low output impedance during the sample interval while keyed on and a very high output impedance during the hold interval while keyed off, thereby permitting storage of the output signal (the error signal) in a reactive component.

The circuit of the present invention provides an efficient sample-and-hold detector which is keyed on and off in a symmetrical fashion to define the sampling interval. The output signal will contain a smaller ripple frequency component than many conventional phase detectors which change the average value of the reference waveform while preserving its shape. Thus, less filtering of the output signal is required in the present circuit. The circuit also provides a low source impedance for charging and discharging the hold capacitor. Further, the circuit can be integrated on a monolithic substrate. This results in part from the fact that similar conductivity transistors are utilized.

Circuits embodying the present invention include first and second transistors having serially coupled collector-to-emitter current paths wherein the input signal is applied to the base of the first transistor, and the output signal is taken from the junction of the emitter of the first transistor and the collector of the second transistor. A feedback path couples the collector of the first transistor to the base of the second transistor. Keying means are provided for keying the first and second transistors into and out of conduction.

The invention is described in greater detail with reference to the following figures and description thereof.

Figure 2:
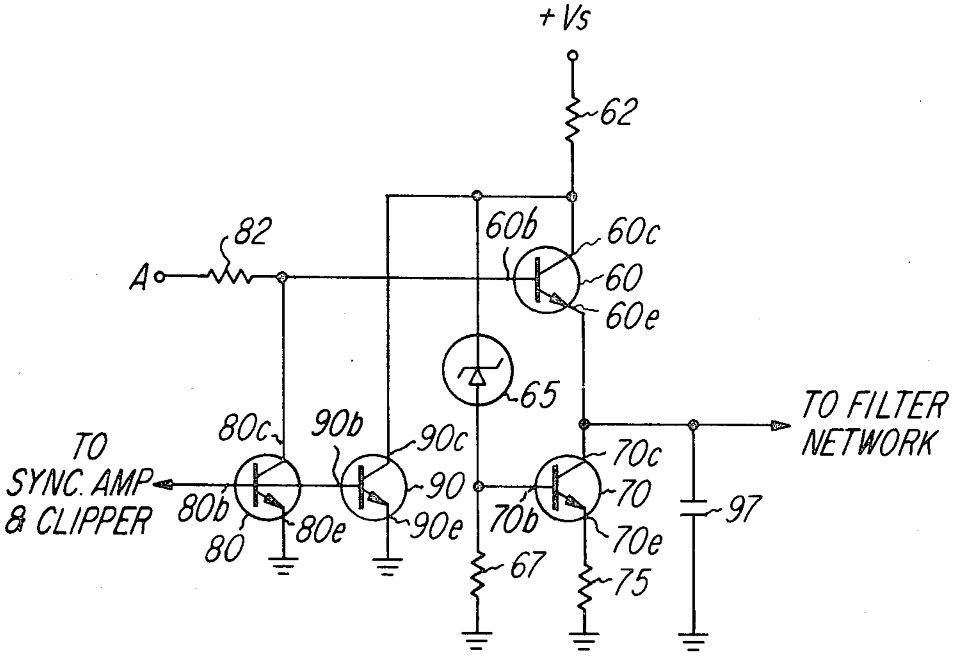

FIG. 1 illustrates in block and schematic diagram form, a color television receiver including a preferred embodiment of the present invention; and FIG. 2 illustrates in schematic diagram form, an alternative embodiment of the invention.

Referring to FIG. 1, an antenna 10 receives composite television signals and couples these signals to a tuner 12 which selects the desired radio frequency signals of a predetermined broadcast channel, amplifies these signals, and converts the amplified radio frequency signals to a lower intermediate frequency (I.F.) signal. The output of tuner 12 is coupled to an I.F. amplifier 14 which amplifies the I.F. signals. The I.F. amplifier 14 supplies signals to an audio processing circuit 16 which detects audio information, amplifies it, and couples the resultant audio frequencies to a speaker 18 to produce the audio portion of the transmitted television program.

Another output of I.F. amplifier 14 is coupled to a video detector stage 20 which derives luminance, chrominance and synchronization information from the intermediate frequency signals. The output of video detector stage 20 is coupled to a video amplifier stage 22. Outputs from video amplifier 22 are coupled to an automatic gain control stage 24, a sync separator stage 26 and a chrominance section 31. Luminance (Y) signals are coupled from the video amplifier 22 to control elements such as cathodes 23 of a television color kinescope 40.

The automatic gain control stage 24 operates in a conventional manner to provide gain control to an RF amplifier in tuner 12 and to IF amplifier 14. Chrominance section 31 operates in conjunction with a color synchronization section 32 to derive color information signals from the signals supplied by video amplifier 22 and applies these signals to control elements **25*r*, 25*g* and 25*b* of color kinescope 40 to reproduce a color image when color information is being transmitted. Keying pulses for the color synchronization section 32** can be supplied from a winding on the horizontal output transformer (not shown).

Sync separator stage 26 separates synchronization information from the video information and also separates the horizontal synchronization information from the vertical synchronization information. The vertical synchronizing pulses are coupled to a vertical oscillator 27 which provides vertical frequency signals which are applied to a vertical output circuit 28. Output stage 28 responds to these signals to provide deflection current by means of terminals Y—Y to a vertical deflection winding 30 associated with kinescope 40. Horizontal synchronizing pulses from sync separator 26 are coupled to a sync amplifier and clipper stage 36. The output from stage 36 supplies negative going sync pulses of approximately 5 microseconds width during the sync pulse interval and couples these signals to a phase comparator stage 50. These signals serve as keying pulses for the comparator. During the remaining portion of each cycle of operation, the output signal from stage 36 conditions transistors 80 and 90 to conduct.

Input power is supplied to stage 50 by means of a power supply, illustrated as $V_s$ in the figure, coupled to a collector terminal **60*c* of a first transistor 60 by means of a collector resistor 62. Transistor 60 is further coupled by means of an emitter terminal 60*e* to a collector terminal 70*c* of a second transistor 70. An emitter terminal 70*e* of second transistor 70 is coupled by means of a resistor 25 to a reference potential such as ground. A feedback path couples terminal 60*c* of transistor 60 to a base terminal 70*b* of transistor 70 and includes a direct current voltage translation and an alternating current coupling device such as an avalanche diode 65. A resistor 67 is coupled from the base 70*b* of transistor 70** to ground.

An input signal, derived as explained below, is represented by $V_i$ in the diagram, and is applied to base terminal **60*b* of first transistor 60 by means of an input resistor 82 and terminal A. Third and fourth transistors 80 and 90 receive keying signals from stage 31 as illustrated by the symbol $V_k$ accompanying the waveform diagram adjacent transistor 80 in the figure. These keying signals are applied to base terminals 80*b* and 90*b* of keying transistors 80 and 90 respectively. Emitter terminal 80*e* and 90*e* of transistors 80 and 90 respectively are coupled to ground in the figure, but may include small emitter degeneration resistors to insure current sharing between them. A collector terminal 80*c* of transistor 80 is coupled to the base terminal 60*b* of first transistor 60**, while a collector terminal 90*c* of transistor 90 is coupled to the base terminal 70*b* of transistor 70. An output terminal 95, at the junction of emitter terminal 60*e* of transistor 60 and collector terminal 70*c* of transistor 70, has a capacitor 97 commonly referred to as the hold capacitor coupled from the terminal to ground. The charge on capacitor 97 determines the error voltage which is coupled to a voltage controlled oscillator 102 by means of a filter network 100 which serves to remove the keying frequency components.

The oscillator 102 develops horizontal frequency signals and responds to changes in the applied control voltage to maintain the desired operating frequency (i.e., 15,734 Hz.). The output of oscillator 102 is coupled to a horizontal deflection output stage 104 which develops the horizontal deflection current and couples this current to the horizontal deflection winding 34 associated with kinescope 40 by means of terminals X—X in the figure. In addition, the output stage 104 provides energy to a horizontal output transformer 110 to develop the high voltage supply required for kinescope 40. Transformer 110 includes a primary winding 111 coupled to the horizontal deflection output stage 104.

A secondary winding 112 provides relatively high voltage pulses to a high voltage multiplier circuit 116. The multiplier steps up the incoming voltage to the desired level (i.e., 27 kv.) and couples the stepped up voltage to the kinescope by means of a terminal 38. An additional secondary winding 115 associated with transformer 110 develops horizontal frequency pulses which are coupled to a wave-shaping network 120 to produce, at an output terminal A thereof, a generally sawtooth shaped voltage waveform centered about a preselected reference potential. Wave-shaping network 120 may include for example an integrating network of conventional design well known in the art. The output signal of network 120 is coupled by a capacitor 125 to an emitter follower stage including a transistor 130. A voltage divider comprising serially coupled resistors 126 and 127 is coupled from a source of direct voltage ($+V_s$) to ground. The resistors are chosen to provide a direct voltage level across emitter resistor 131 in the emitter circuit of transistor 130 which is coupled by means of interconnected terminals A and resistor 82 and serves as the collector supply for transistor 80. The resultant output signal at terminal A is illustrated by the waveform shown adjacent to the terminal, and is a generally sawtooth shaped waveform superimposed upon a preselected direct voltage level.

In operation, the phase comparator circuit is keyed on and off during the sample-and-hold modes respectively by the keying signals ($V_k$) from stage 36. During the hold portion of operation, the keying signal $V_k$ is sufficiently positive to condition keying transistors 80 and 90 to be conductive. An input resistor 82 serves to limit the collector current of transistor 80. The collector current of transistor 90 is limited by the potential drop across resistor 62. Since collector terminals 80*c* and 90*c* are coupled to base terminals 60*b* and 70*b* of transistors 60 and 70 respectively, when the keying transistors are conductive, the base voltages of transistors 60 and 70 will be lowered sufficiently to bias them out of conduction. With transistors 60 and 70 nonconducting, the output voltage present at terminal 95 remains at a quiescent level corresponding to the existent charge on hold capacitor 97.

At the time the reference signal ($V_i$) is to be sampled, for example, during the horizontal sync pulse interval, the keying signal $V_k$ swings sharply negative a sufficient amount to drive keying transistors 80 and 90 out of conduction thereby allowing the base voltage at base terminals 60*b* and 70*b* of transistors 60 and 70 to rise. As noted above, the reference signal is representative of the horizontal oscillator frequency. If the oscillator is in synchronism with the incoming horizontal sync pulses, the center of the keying pulse $V_k$ may for example be aligned with the sawtooth reference signal $V_i$ such that equal positive and negative areas (with respect to the direct voltage level present on $V_i$) are presented to the comparator 50. When the oscillator is out of synchronization, however, the inputs $V_k$ and $V_i$ are aligned to present a net positive or negative signal to comparator 50 while in the sampling mode of operation.

During the sampling interval, transistors 60 and 70 operate to provide an error voltage to oscillator 102 in the following manner. When $V_i$ is negative with respect to its direct voltage level, transistor 60 is reversed biased (assuming the stored voltage on capacitor 97 is greater than the instantaneous $V_i$ less the base-to-emitter forward voltage drop of transistor 60) and its collector voltage is at a relatively high positive voltage. Avalanche diode 65, biased in its avalanche mode by the supply voltage $V_s$ and resistors 62 and 67, serves as a feedback path coupling collector terminal 60*c* on transistor 60 to base terminal 70*b* on transistor 70. The positive collector signal is therefore coupled to base 70*b* which causes transistor 70 to conduct, thereby discharging capacitor 97. As $V_i$ increases and swings positive, transistor 60 is forward biased and conducts to increase the charge on capacitor 97. Transistor 60 collector current produces a voltage drop across resistor 62 which when coupled by means of diode 65 to the base terminal 70*b* of transistor 70 turns this transistor off. The amount of net charge increase or decrease on capacitor 97 is therefore determined by the conduction of transistor 60 which increases the charge on capacitor 97 and the conduction of transistor 70 which decreases its charge. If for example, the reference signal is positive during the entire sampling interval (which may occur if the oscillator 102 is off frequency), transistor 60 will conduct during the entire sampling interval to increase the output voltage at terminal 95 by charging capacitor 97. This error voltage is coupled to the oscillator 102 to return the oscillator to the desired frequency. It is noted that a degenerative resistor 75 coupled to the emitter terminal 70*e* may be employed to stabilize the comparator.

At the end of the sampling interval, keying pulse $V_k$ swings sharply positive, thereby biasing transistors 80 and 90 well into conduction which in turn reduces the base voltages of transistors 60 and 70 sufficiently to drive these devices out of conduction. Capacitor 97, therefore, will hold its charge until the next sampling interval.

An alternative embodiment of the invention is illustrated by the schematic diagram of FIG. 2. The circuit elements are essentially the same as that shown in FIG. 1 and have corresponding numerals. The significant difference is that keying transistor 90 has its collector terminal 90*c* coupled to the collector terminal 60*c* of transistor 60 rather than base terminal 70*b* of transistor 70. The feedback path from collector 60*c* to base 70*b* as explained with reference to FIG. 1 will allow transistor 90 to turn transistor 70 on and off in response to keying pulses which drive transistor 90 from full conduction to cutoff. In crowded multifunction integrated circuit chips, economy of available area is an important design consideration. The advantage of the circuit as illustrated in FIG. 2 is that when integrated onto a monolithic circuit substrate, transistors 90 and 60 can share a common collector isolation area, thereby conserving area. The comparator circuit of FIG. 2 operates in an identical manner as that described with reference to FIG. 1 to develop an error voltage across capacitor 97.

What is claimed is:

1. A sample-and-hold circuit comprising:

first and second transistors of like type conductivity each having base, collector and emitter terminals, and having their collector-to-emitter current paths serially coupled from a source of supply voltage to a reference potential, means for applying a signal to be sampled to said base terminal of said first transistor, a feedback path coupling signal frequencies at said collector terminal of said first transistor to a base terminal on said second transistor, keying circuit means for changing said first and second transistors between states of simultaneous conduction and simultaneous nonconduction, input keying means for supplying a signal to said keying circuit means to determine the periods during which samples are to be taken, and output circuit means coupled from a junction of said first transistor and said second transistor for developing an output signal from said circuit.

2. A circuit as defined in claim 1 wherein:

said keying circuit means includes third and fourth transistors, each having base, collector and emitter electrodes, said collector on said third transistor being coupled to said base on said first transistor and said emitter on said third transistor being coupled to a reference potential, said collector terminal on said fourth transistor being coupled to said base terminal on said second transistor and said emitter on said fourth transistor being coupled to a reference potential, and said input keying signals being applied to said base terminals on said third and fourth transistors which respond thereto to turn said first and second transistors on and off, thereby defining a sample-and-hold portion of operation.

3. A circuit as defined in claim 1 wherein said output circuit means includes a hold capacitor coupled from said junction of said first and second transistors to a reference potential.

4. A circuit as defined in claim 1 wherein:

said keying circuit means includes third and fourth transistors, each having base, collector and emitter terminals and wherein said collector terminal on said third transistor is coupled to said base terminal on said first transistor and wherein said collector terminal on said fourth transistor is coupled to said collector terminal on said first transistor, said emitter terminals on said third and fourth transistors being coupled to a reference potential, and said base terminals on said third and fourth transistors being coupled to said input keying signal and responding thereto to turn said first and second transistors on and off.

5. A sample-and-hold circuit comprising:

first, second, third and fourth transistors, each having base, collector and emitter electrodes, a source of operating potential coupled to said collector of said first transistor by means of a collector load resistor, said collector on said second transistor coupled to said emitter on said first transistor and said emitter terminal on said second transistor coupled to ground potential by means of an emitter resistor, a feedback path comprising an avalanche diode coupled from said collector terminal on said first transistor to said base terminal on said second transistor and biased to operate in the avalanche mode, means for applying a reference signal to be sampled to said base terminal of said first transistor, means for coupling said collector terminal of said third transistor to said base terminal of said first transistor, means for coupling said collector terminal of said fourth transistor to said collector terminal of said second transistor, means coupling said emitter terminals on said third and fourth transistors to ground, a hold capacitor coupled from said collector terminal on said second transistor to ground, output circuit means coupled across said hold capacitor, and a source of keying signals of predetermined time relationship to said reference signal and coupled to said base terminals of said third and fourth transistors, said third and fourth transistors responsive to said keying signals to render said first and second transistors conductive during a sample portion of operation and nonconductive during a hold portion of operation, and whereby said first and second transistors are responsive to said reference signals to vary the charge on said hold capacitor during said sample portion of operation.

6. A sample-and-hold circuit comprising:

a first transistor having base, collector and emitter terminals, said collector terminal coupled to a source of operating potential, a source of reference signals to be sampled, said source coupled to said base terminal of said first transistor, an emitter terminal on said first transistor coupled to a hold capacitor whereby emitter current flowing in said first transistor will charge said hold capacitor, a second transistor having base, collector and emitter terminals wherein said emitter terminal on said second transistor is coupled to a reference potential, and said collector terminal on said second transistor is coupled to said emitter terminal on said first transistor and to said hold capacitor, a feedback path coupled from said collector on said first transistor to said base terminal on said second transistor, said second transistor responsive to signals coupled to its base terminal to discharge said hold capacitor, a source of keying signals of a predetermined time relation to said reference signals, keying circuit means responsive to said keying signals and coupled to said first and second transistors for inhibiting their conduction during a hold portion of operation, and allowing their conduction during a sample portion of operation, and output circuit means coupled across said hold capacitor.

* * * * *

UNITED STATES PATENT OFFICE

CERTIFICATE OF CORRECTION

Patent No. 3,646,362 Dated February 29, 1972

Inventor(s) Allen LeRoy Limberg

It is certified that error appears in the above-identified patent and that said Letters Patent are hereby corrected as shown below:

Column 6, line 4 (patent Claim 5), "said second" should read -- said first --.

Signed and sealed this 16th day of April 1974.

(SEAL)
Attest:

EDWARD M.FLETCHER,JR.
Attesting Officer

C. MARSHALL DANN
Commissioner of Patents